(12) United States Patent
Leidy et al.

(10) Patent No.: US 6,367,287 B1
(45) Date of Patent: Apr. 9, 2002

(54) TWO-AXIS MOTION OF TAKE-OUT TONGS IN AN INDIVIDUAL SECTION GLASSWARE FORMING MACHINE

(75) Inventors: D. Wayne Leidy, Perrysburg; Frank J. DiFrank, Toledo, both of OH (US); Robert L. Mulgrave, El Paso, TX (US)

(73) Assignee: Owens-Brockway Glass Container Inc., Toledo, OH (US)

(*) Notice: Subject to any disclaimer, the term of this patent is extended or adjusted under 35 U.S.C. 154(b) by 0 days.

(21) Appl. No.: 09/290,977

(22) Filed: Apr. 13, 1999

(51) Int. Cl.[7] .............................. C03B 9/40; C03B 9/447
(52) U.S. Cl. .......................................... 65/160; 65/260
(58) Field of Search .................. 65/160, 260; 318/575, 318/611, 623, 625, 135, 38, 632, 640; 310/12

(56) References Cited

U.S. PATENT DOCUMENTS

| | | |
|---|---|---|
| 3,895,931 A | 7/1975 | Hamilton |
| 4,343,644 A | 8/1982 | Hullen et al. |
| 4,351,663 A * | 9/1982 | Wood ............................ 65/66 |
| 4,422,027 A | 12/1983 | Mohlere |
| 4,427,431 A | 1/1984 | Mumford et al. |
| 4,485,339 A * | 11/1984 | Trost ........................... 318/640 |
| 4,505,464 A | 3/1985 | Chitayat |
| 4,507,597 A * | 3/1985 | Trost ........................... 318/653 |
| 4,587,466 A | 5/1986 | Berg et al. |
| 4,705,552 A | 11/1987 | Liska et al. |
| 4,775,403 A | 10/1988 | Braithwaite |
| 4,812,725 A | 3/1989 | Chitayat |
| 4,834,353 A | 5/1989 | Chitayat |
| 4,892,183 A | 1/1990 | Fenton |
| 5,092,449 A | 3/1992 | Bolin et al. |
| 5,220,262 A | 6/1993 | Kneifel, II et al. |
| 5,284,076 A | 2/1994 | Fritz et al. |
| 5,425,794 A * | 6/1995 | Frederick et al. .............. 65/160 |
| 5,429,651 A * | 7/1995 | Bolin ........................... 65/241 |
| 5,472,077 A | 12/1995 | Bolin |
| 5,587,000 A * | 12/1996 | Mann et al. ................... 65/260 |
| 5,858,049 A | 1/1999 | Borbone |
| 5,895,513 A | 4/1999 | Ciriello et al. |
| 5,904,745 A * | 5/1999 | Nafziger et al. ............. 65/29.1 |

FOREIGN PATENT DOCUMENTS

EP 0903326 3/1999

* cited by examiner

*Primary Examiner*—Sean Vincent

(57) ABSTRACT

An individual section glassware forming machine that includes at least one blow mold for forming articles of glassware, a sweepout station for transferring glassware to a machine conveyor, and a take-out mechanism for transferring glassware from the blow mold to the sweepout station. The take-out mechanism comprises first and second electromagnetic stators mounted in fixed position above the blow mold and the sweepout station. A first electromagnetic armature is mounted for linear motion along a horizontal axis adjacent to the first stator. A second electromagnetic armature is mounted to the first armature for linear motion along a vertical axis adjacent to the second stator. Take-out tongs are carried by the second armature for engaging and transferring glassware from the blow mold to the sweepout station. The second stator in the preferred embodiment of the invention is disposed in a vertical plane, and has a first dimension corresponding to the motion of the first armature along the first axis and a second dimension perpendicular to the first dimension corresponding to motion of the second armature along the second axis.

18 Claims, 12 Drawing Sheets

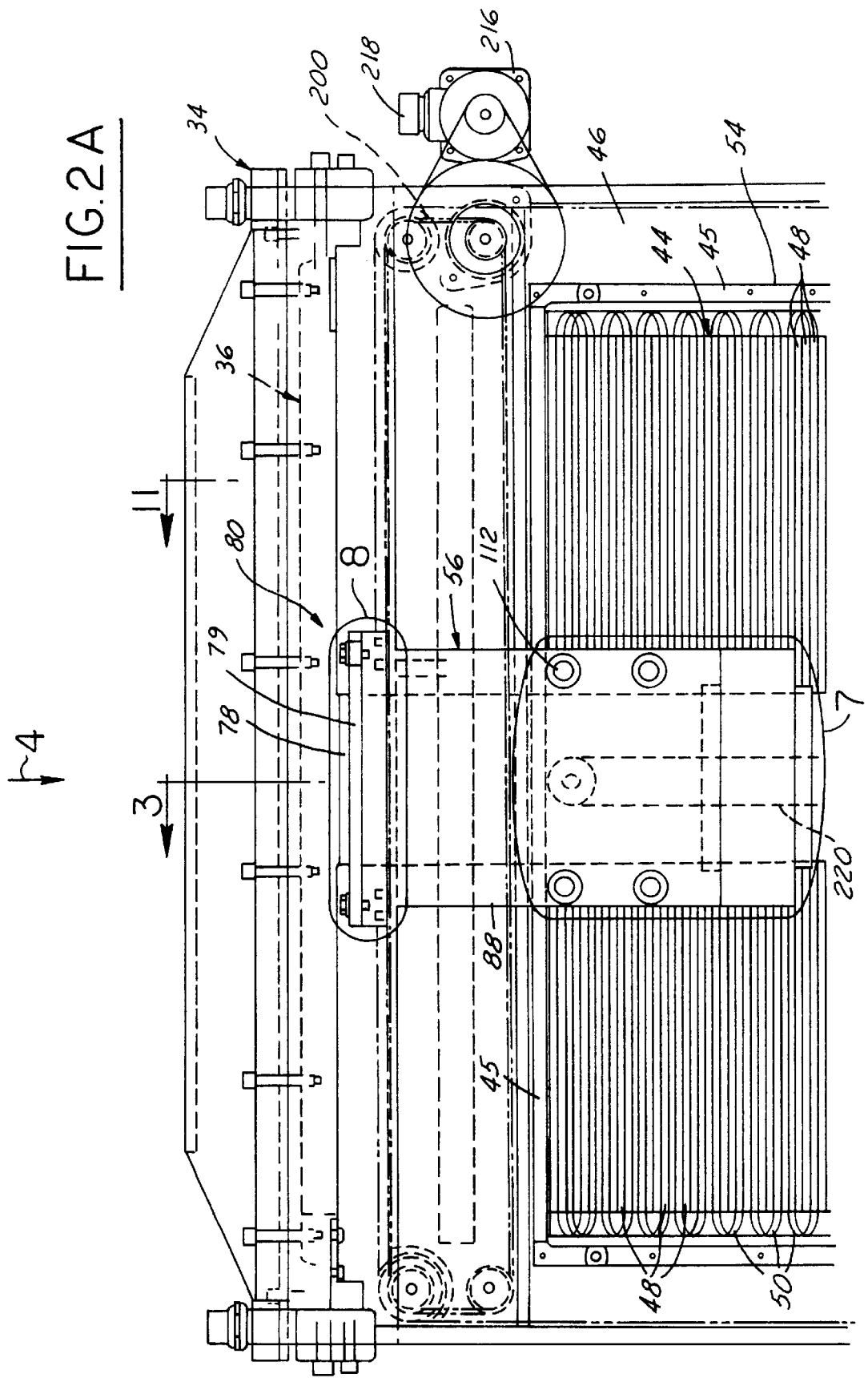

TWO-AXIS MOTION OF TAKE-OUT TONGS IN AN INDIVIDUAL SECTION GLASSWARE FORMING MACHINE

The present invention is directed to an electromagnetic system for obtaining motion along two orthogonal axes, and more particularly to two-axis motion of take-out tongs in an individual section glassware forming machine.

BACKGROUND AND OBJECTS OF THE INVENTION

An individual section glassware forming machine conventionally comprises a plurality of individual sections disposed adjacent to each other in a line parallel to a machine conveyor. Each machine section includes one or more blank molds for forming parisons from gobs of molten glass, one or more blow molds for blowing the parisons into articles of glassware, a sweepout station (sometimes referred to as a pushout station) for transferring articles of glassware onto the machine conveyor, and take-out tongs for transferring the articles of glassware from the blow molds to the sweepout station. The individual sections operated independently of each other but in synchronism at a defined phase relationship to each other corresponding to the so-called firing order of the machine. An individual section machine of this character is disclosed, for example, in U.S. No. Pat. 4,427,431.

The take-out tongs of a glassware forming machine section must move in two axes, vertically to remove the articles of glassware from the blow molds and deposit the glassware on the dead plate of a sweepout station, and laterally (either linearly or rotationally) between the blow molds and the dead plate. These motions in the past have been obtained pneumatically by means of air actuators, and a multiplicity of air valves coupled to a machine timing shaft or to machine control electronics. Attempts to replace the air actuators with electromagnetic actuators or motors have not been entirely successful in part due to the harsh environmental conditions in which an individual section machine operates, and because of limited space availability. Furthermore, there is a problem associated with motion of electrical conductors. In typical two-axis systems involving two electric motors, the first motor is mounted on a fixed frame and coupled to a movable carriage. The second motor and the operating mechanism (such as take-out tongs) are mounted on the second carriage. The electrical conductors to the second motor thus must move along with the carriages, and numerous solutions have been proposed to protect these conductors from abrasion and damage. Past attempts to employ electric motors have failed because of wire abrasion, and because of vibration at the pick-up tongs.

It is therefore a general object of the present invention to provide a motor-driven two-axis motion control system for controlling motion at the take-out tongs of an individual section glassware forming machine and other like applications. Another and more specific object of the present invention is to provide a two-axis motion system of the described character in which all electrical wiring is stationary, which is particularly well adapted for use in the confined space of an individual section glassware forming machine, in which lubricant is self-contained, leading to enhanced operating lifetime and reduced product contamination, which is particularly well adapted for use in the harsh environment of an individual section glassware forming machine, and which employs rugged and reliable components. A further object of the present invention is to provide a two-axis motion system of the described character in which vibration is reduced or eliminated.

SUMMARY OF THE INVENTION

An individual section glassware forming machine in accordance with one aspect of the present invention includes at least one blow mold for forming articles of glassware, a sweepout station for transferring glassware to a machine conveyor, and a take-out mechanism for transferring glassware from the blow mold to the sweepout station. The take-out mechanism comprises first and second electromagnetic stators mounted in fixed position above the blow mold and the sweepout station. A first electromagnetic armature is mounted for linear motion along a first axis (e.g., horizontal) adjacent to the first stator, such that electromagnetic coupling between the first stator and the first armature propels the first armature along the first axis. A second electromagnetic armature is mounted to the first armature for linear motion along a second axis (e.g., vertical) perpendicular to the first axis adjacent to the second stator, such that electromagnetic coupling between the second stator and the second armature propels the second armature along the second axis with respect to the first armature. Take-out tongs are carried by the second armature for engaging and transferring glassware from the blow mold to the sweepout station. The second stator in the preferred embodiment of the invention is disposed in a vertical plane, and has a first dimension corresponding to the motion of the first armature along the first axis and a second dimension perpendicular to the first dimension corresponding to motion of the second armature along the second axis.

The first armature in the preferred embodiment of the invention is mounted on a first carriage for motion along the first axis, and the second armature is mounted on a second carriage carried by the first carriage for motion along the second axis with respect to the first carriage and the first armature. The take-out tongs are suspended from the second carriage. The first and second carriages are movably coupled to the support frame, preferably by tension cables, to reduce or eliminate vibration at the take-out tongs. The armatures comprise respective magnets carried by the associated carriages for motion adjacent and opposed to the associated stators. Each stator preferably comprises a plurality of ferromagnetic laminations coupled to associated stator coils. The stator coils are thus disposed in stationary position surrounding the associated stator laminations, and do not move with the armatures and carriages. Furthermore, the entire two-axis motion system comprises a narrow assembly that can be readily encased for protection against grit and other contaminants in the harsh environment of an individual section machine glassware forming system. Lubricant may be self-contained within the assembly for enhancing the operating life of the assembly.

Although the two-axis motion system of the invention is disclosed in conjunction with, and specifically adapted for use in conjunction with, the take-out tongs of an individual section glassware forming machine, it will be recognized that the system of the invention can be readily employed in other applications. Thus, in accordance with a second aspect of the present invention, a two-axis motion system comprises first and second electromagnetic stators mounted in a first plane, and first and second electromagnetic armatures mounted for motion along respective axes parallel and adjacent to the plane of the armatures. Electrical connection is made using stationary wiring.

BRIEF DESCRIPTION OF THE DRAWINGS

The invention, together with additional objects, features and advantages thereof, will be best understood from the following description, the appended claims and the accompanying drawings in which:

FIGS. 2A and 2B together comprise an elevational view on an enlarged scale of the take-out mechanism in the machine of FIG. 1;

DETAILED DESCRIPTION OF PREFERRED EMBODIMENTS

Figure 1:
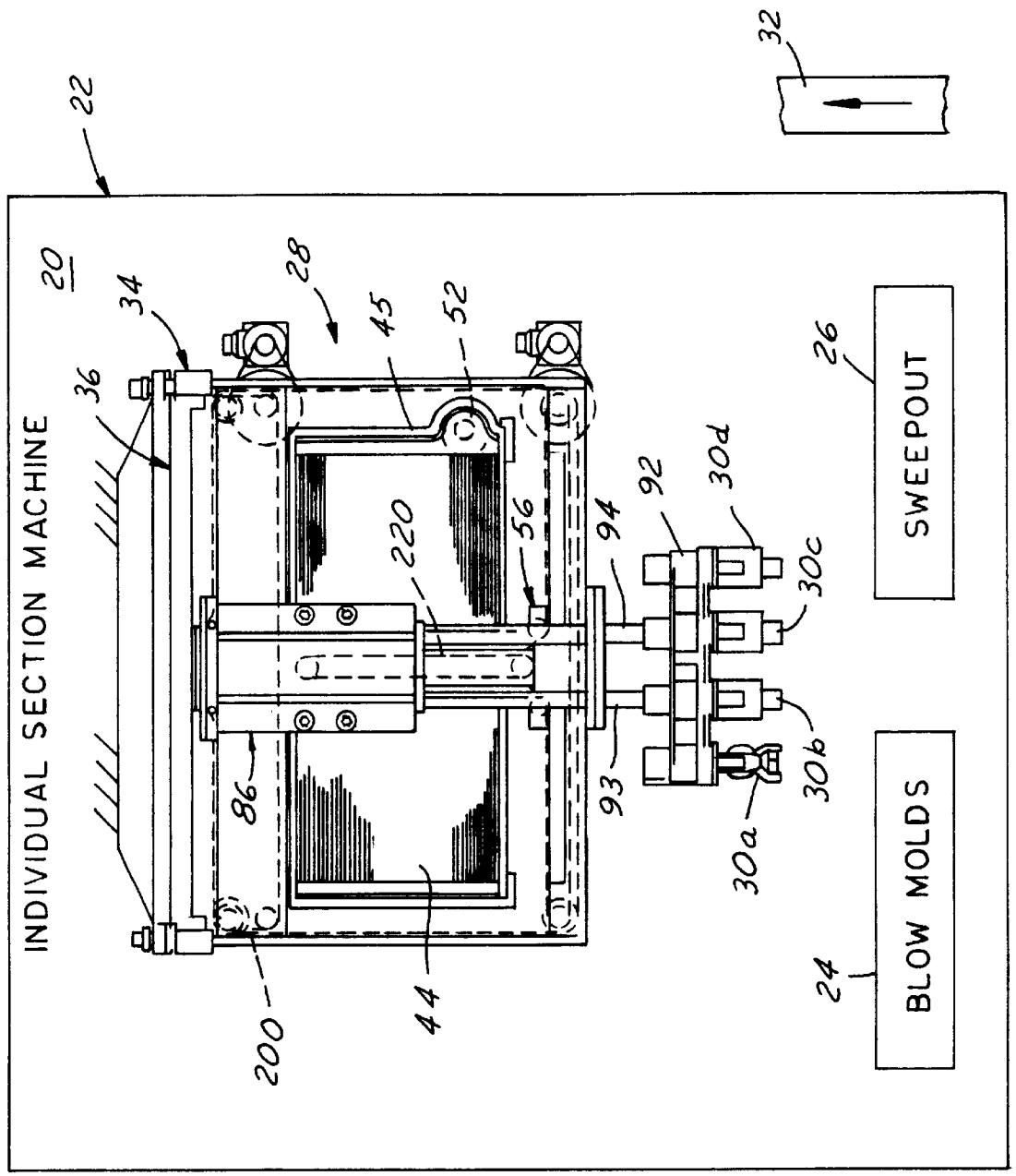
FIG. 1 is a partially schematic diagram of an individual section glassware forming machine embodying take-out tongs coupled to a two-axis motion system in accordance with a presently preferred embodiment of the invention.

FIG. 1 illustrates a portion of one section 20 of an individual section glassware forming machine 22. Each section 20 of machine 22 includes a plurality of blank molds (not shown) that receive glass gobs from an associated gob distributor, and invert arms for transferring glass parisons from the blank molds to an array of associated blow molds 24. Articles of glassware formed within blow molds 24 are transferred to a section sweepout station 26 by a take-out mechanism 28. System 22 in FIG. 1 is a so-called quad system, in which each section 20 contains four blank molds and four associated blow molds 24 for simultaneously forming four articles of glassware. Take-out mechanism 28 thus includes four take-out tongs 30a, 30b, 30c and 30d for transferring the four blown articles of glassware simultaneously to the deadplate of sweepout station 26. The sweepout (or pushout) mechanism at station 26 transfers the four articles of glassware simultaneously from the associated deadplate onto a machine conveyor 32. Conveyor 32 thus receives glassware from all sections 20 of machine 22 in sequence, and conveys the glassware to an annealing lehr and other post-production stages.

Figure 2B:
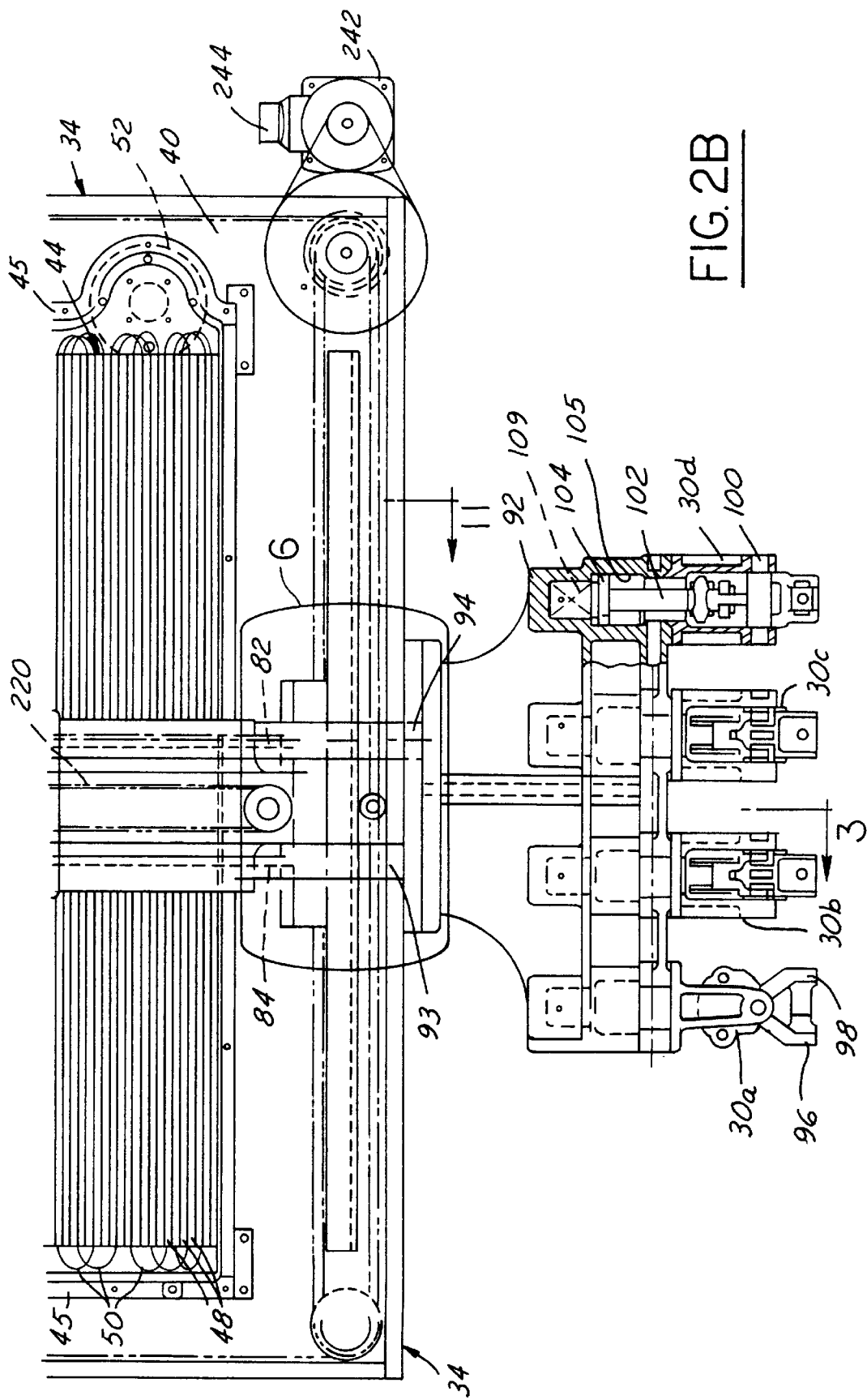
Figure 3:
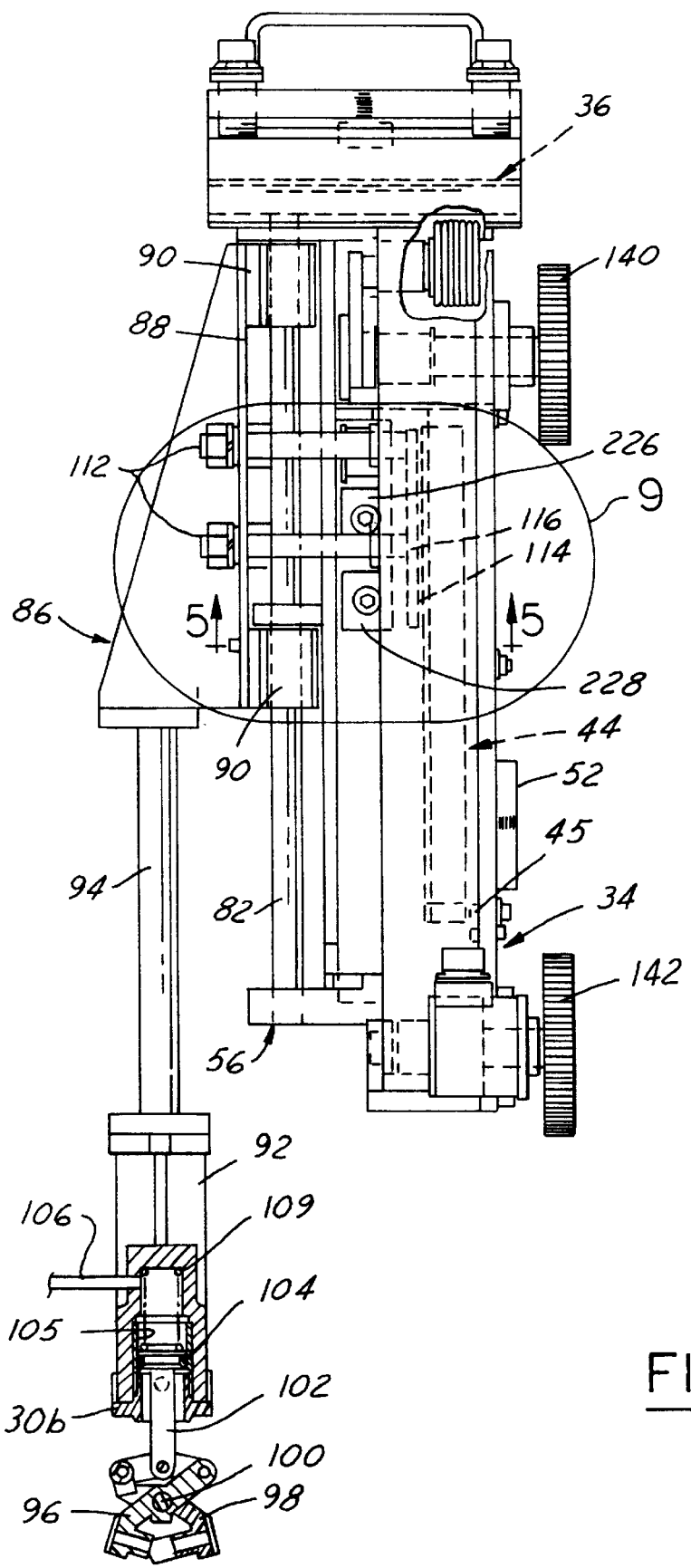
FIG. 3 is a sectional view taken substantially along the line 3—3 of FIGS. 2A and 2B.
Figure 4:
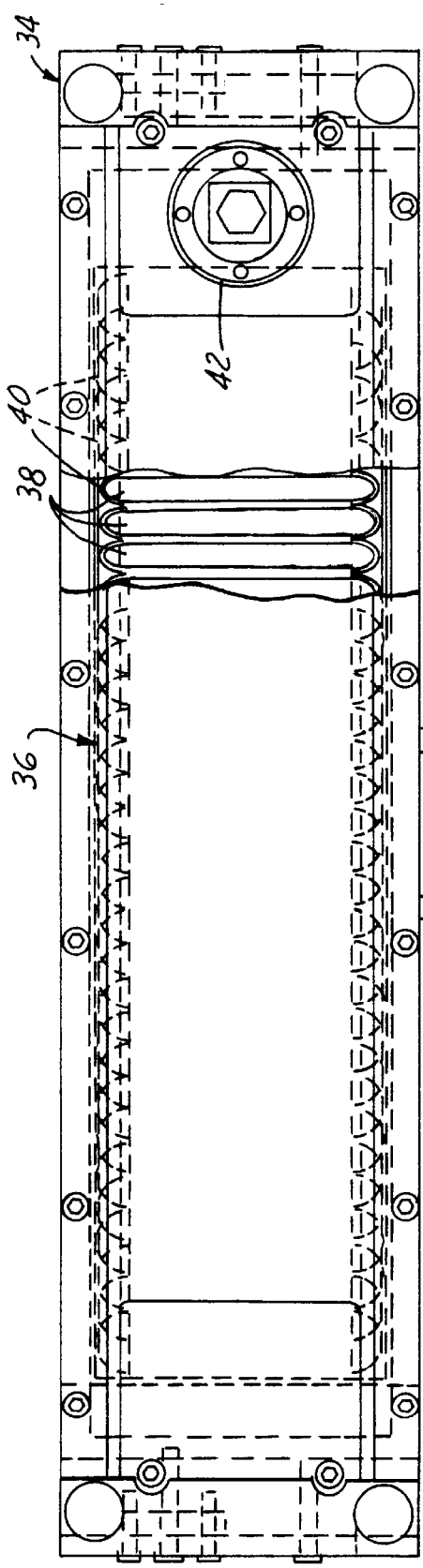
FIG. 4 is a top plan view taken substantially from the direction 4 in FIG. 2A.
Figure 10:
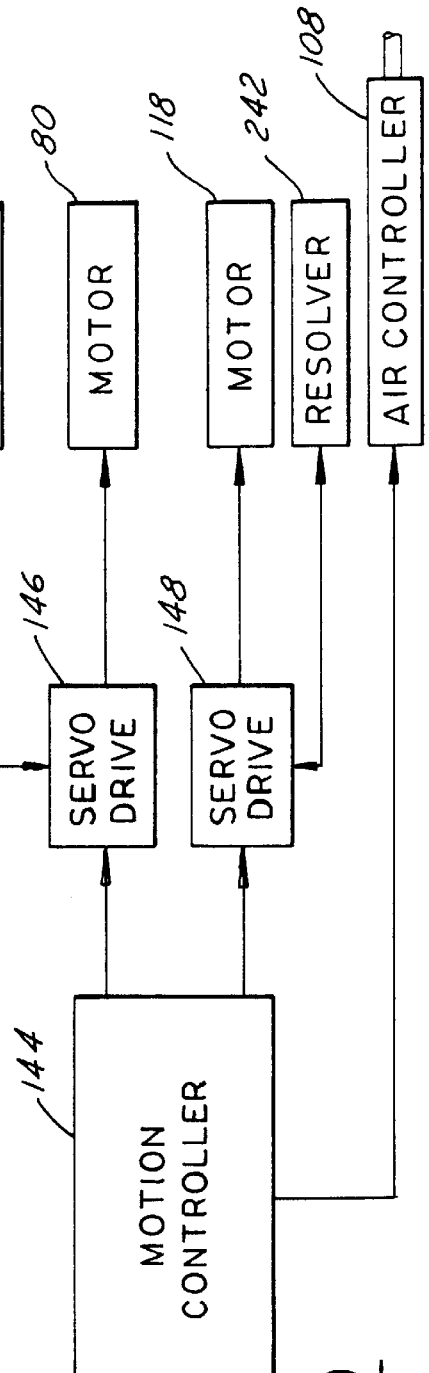
FIG. 10 is a functional block diagram of the take-out mechanism and associated control electronics.
Figure 9:
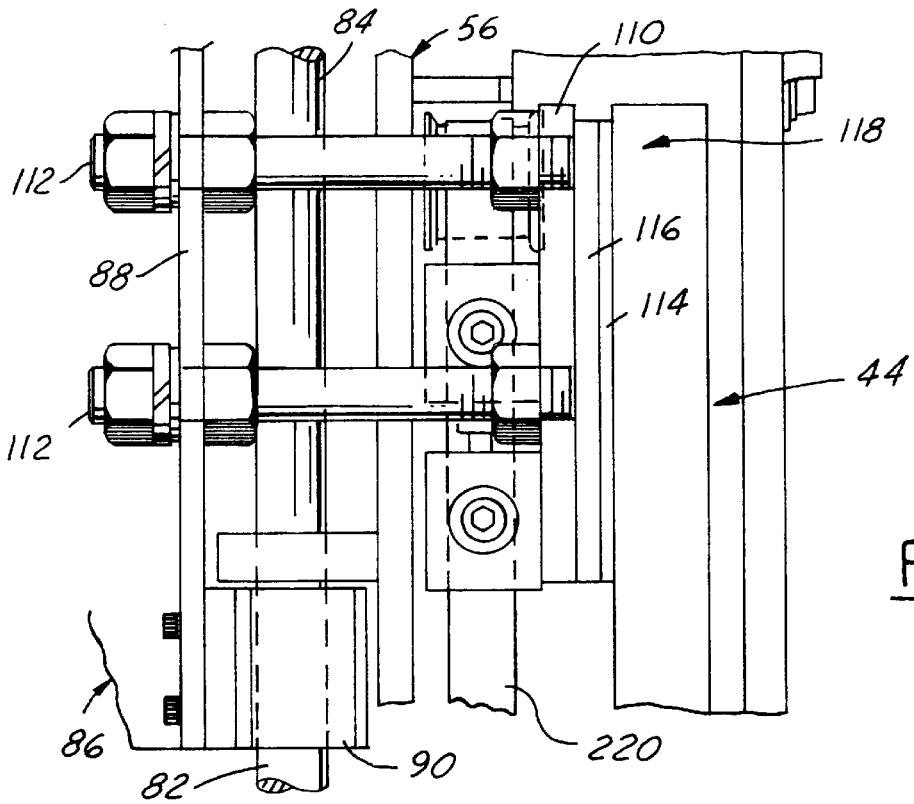
FIG. 9 is an enlarged fragmentary partially sectioned view of the portion of FIG. 3 within the circle 9.
Figure 5:
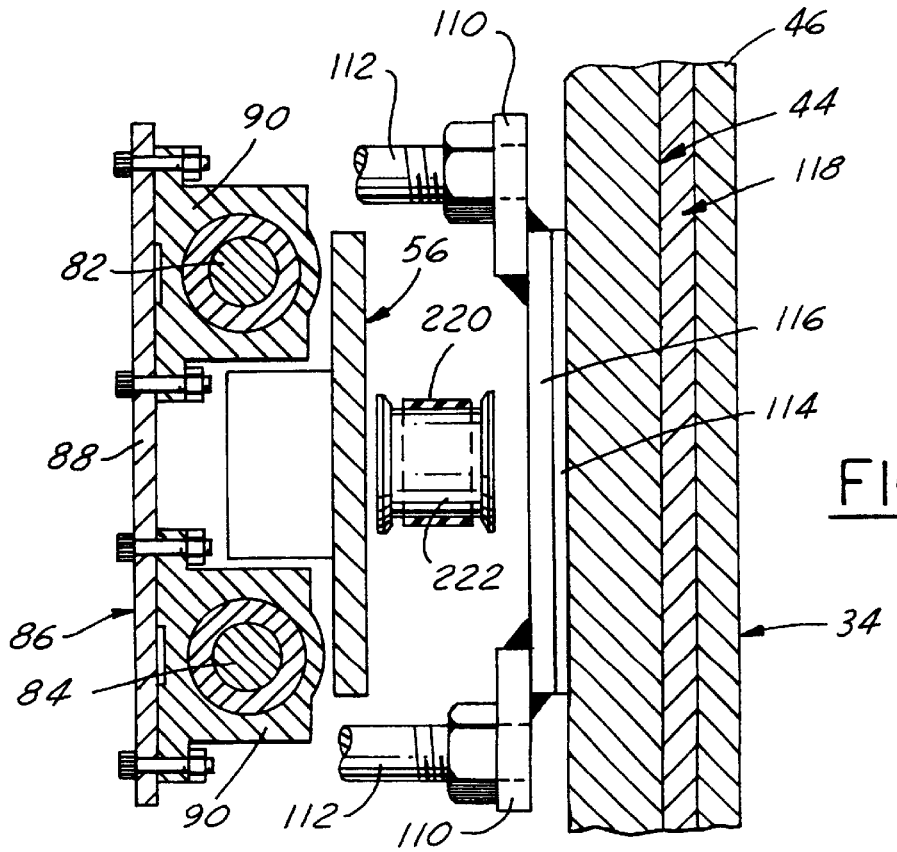
FIG. 5 is a sectional view taken substantially along the line 5—5 in FIG. 3.

Take-out mechanism 28 comprises a rectangular frame 34 (FIGS. 1–4) suitably mounted above blow molds 24 and sweepout station 26. (Frame 34 may be mounted in fixed position, or itself may be coupled to suitable positioning means.) A first stator 36 is mounted along the upper edge of frame 34. Stator 36 comprises a plurality of ferromagnetic laminations 38 disposed in facing engagement with each other along a first (horizontal) axis. A plurality of stator coils 40 surround and are electromagnetically coupled to laminations 38 for electromagnetically energizing the laminations in the usual manner. Windings 40 are connected to an electrical connector 42 carried by frame 34 for connection to external control electronics (FIG. 10). A second stator 44 is mounted by brackets 45 on a flat panel 46 that encloses one side of frame 34. Frame 34 thus mounts stators 36, 44 in stationary position relative to each other. Stator 44 comprises a plurality of individual ferromagnetic laminations 48 in facing engagement with each other along a second (vertical) axis. Stator laminations 48 are surrounded by an associated set of stator coils 50, which are connected to an electrical connector 52 (FIGS. 2B and 3) for connecting stator 44 to associated control electronics (FIG. 10). The assembly of brackets 45, laminations 48, windings 50 and connector 52 is mounted as a sub-assembly within a frame 54 on panel 46. Thus, as best seen in FIG. 3, stator 44 is disposed in a vertical plane, with vertically stacked horizontally extending laminations and coils for obtaining controlled vertical motion. Stator 36 has horizontally stacked laminations and coils for obtaining controlled horizontal motion. As shown in FIG. 3, stator 36 is cantilevered by frame 34 above and outward from the plane of stator 44.

Figure 8:
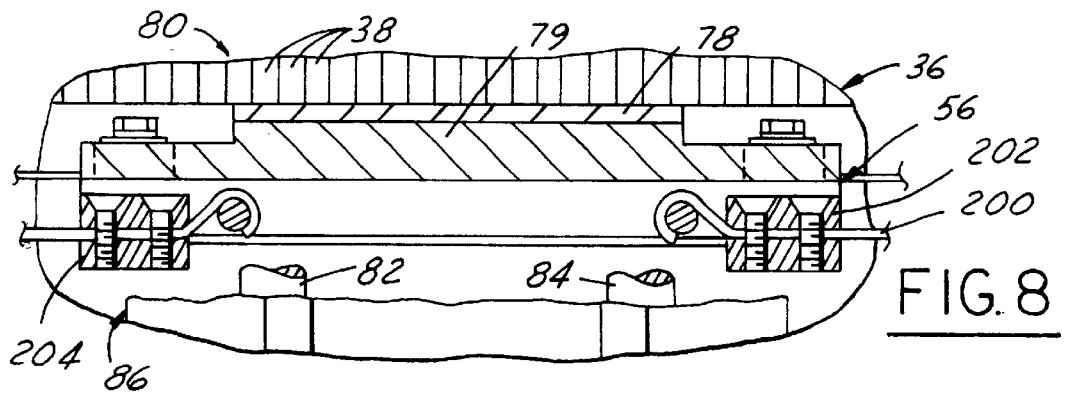
FIGS. 6, 7 and 8 are enlarged fragmentary partially sectioned views of portions of the take-out mechanism within the respective circles 6, 7 and 8 in FIGS. 2A and 2B.
Figure 7:
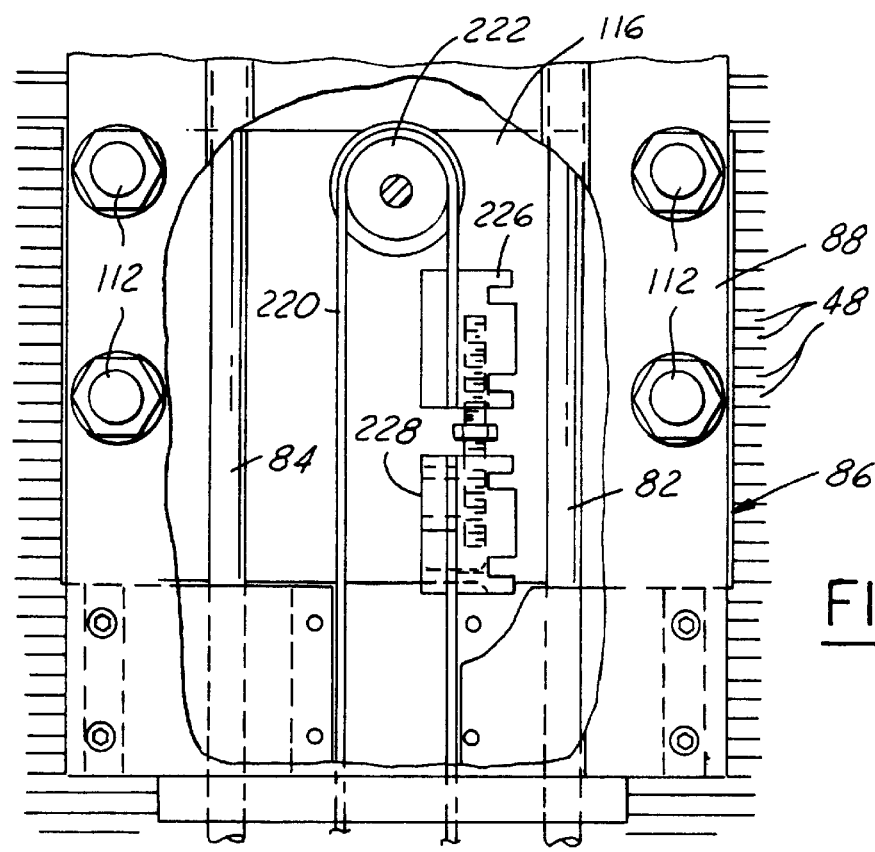
Figure 6:
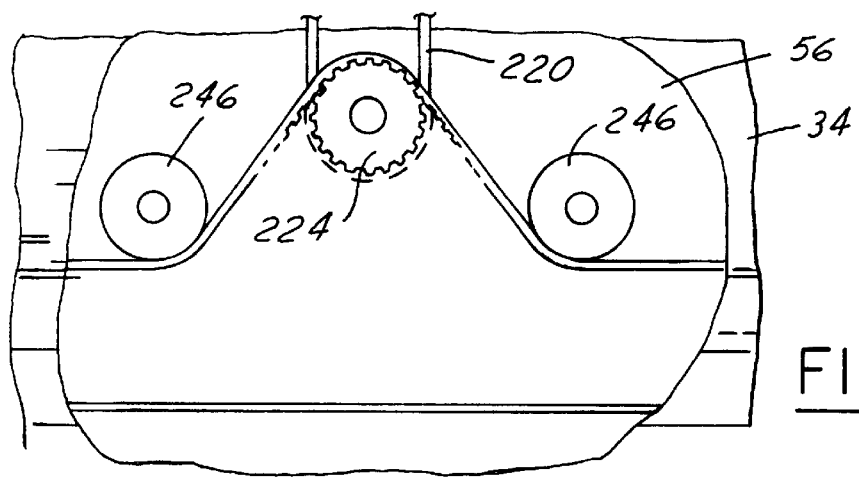
Figure 11:
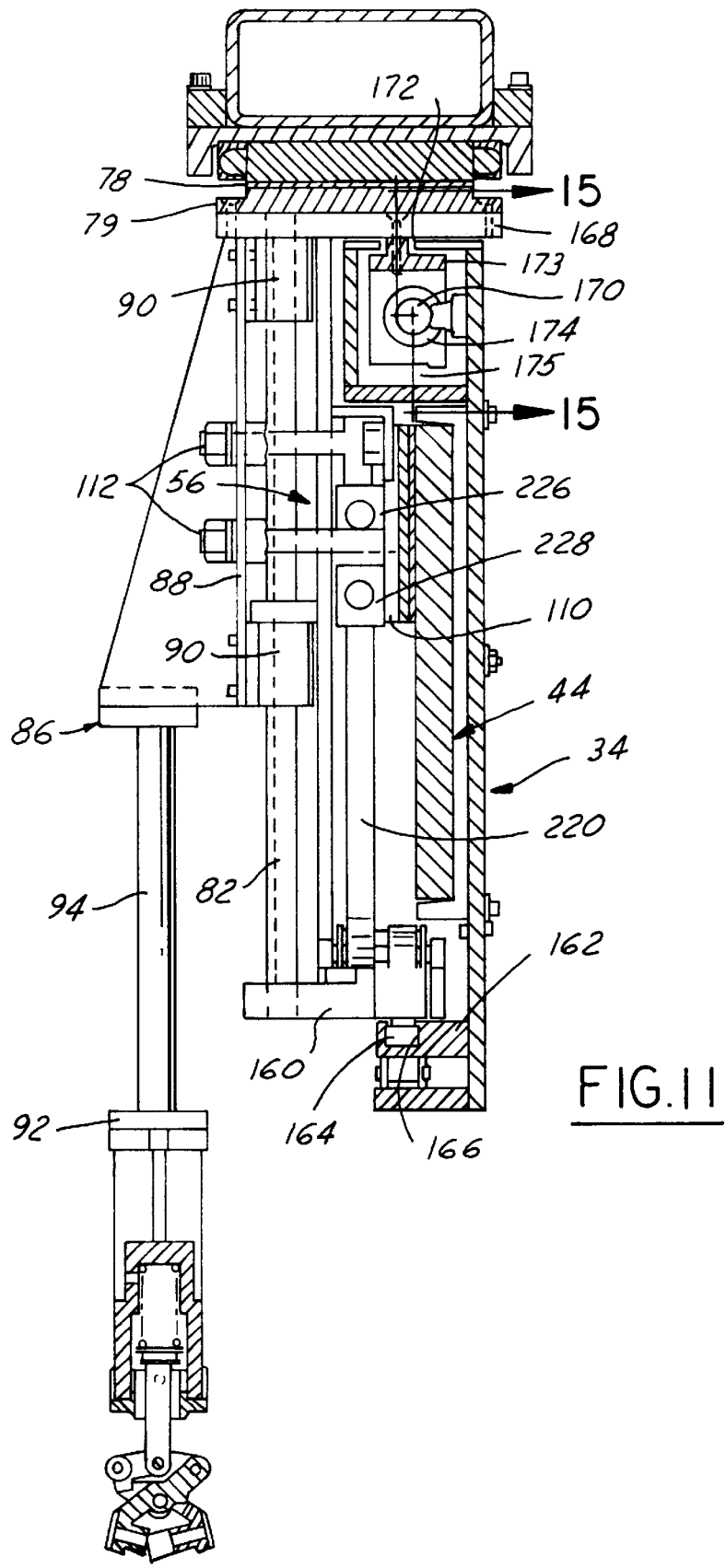
FIG. 11 is a sectional view taken substantially along the line 11—11 in FIGS. 2A and 2B.
Figure 12:
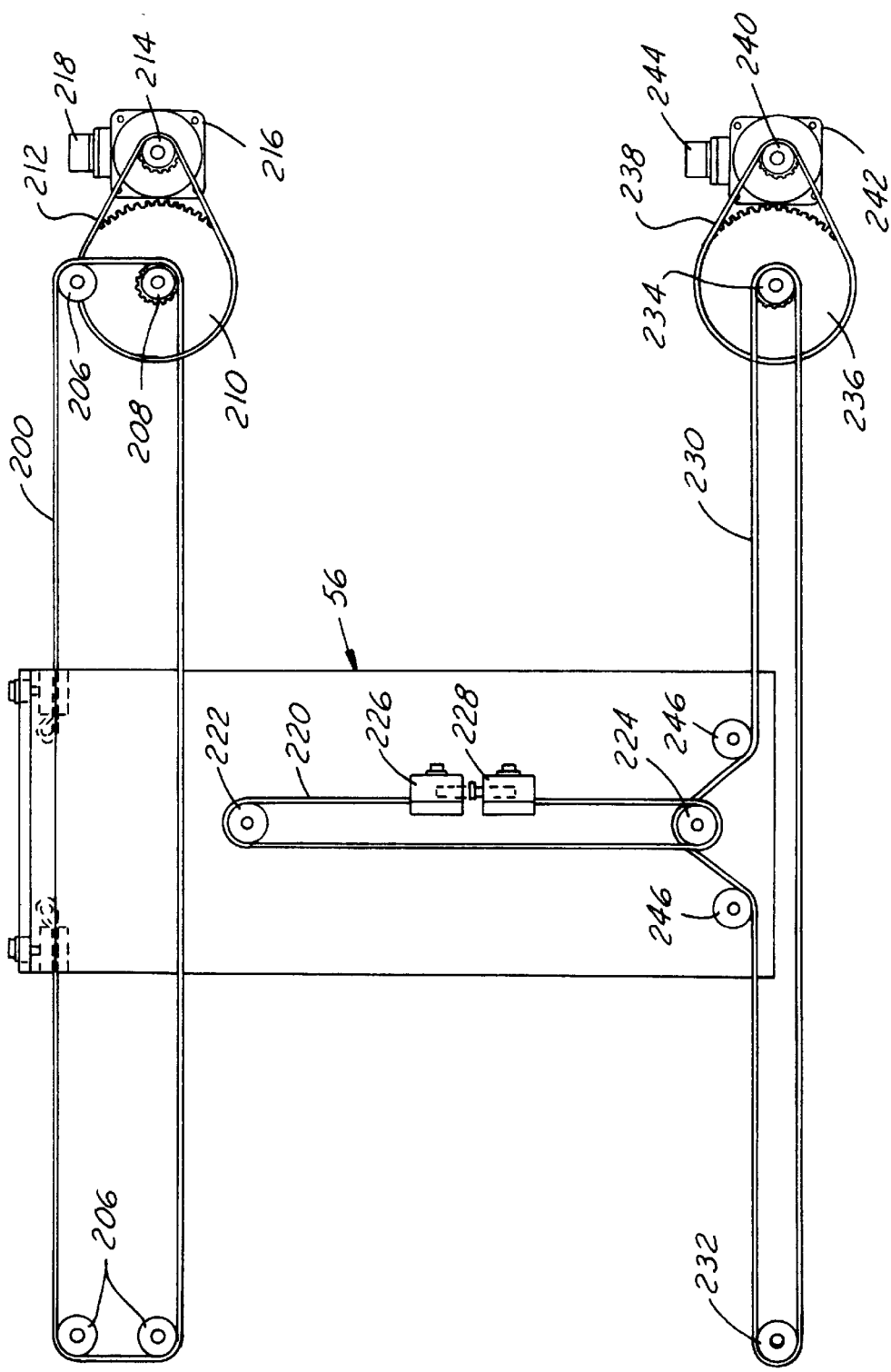
FIG. 12 is a schematic diagram that illustrates coupling of the horizontal and vertical carriages to the horizontal and vertical position sensors (resolvers)
Figure 15:
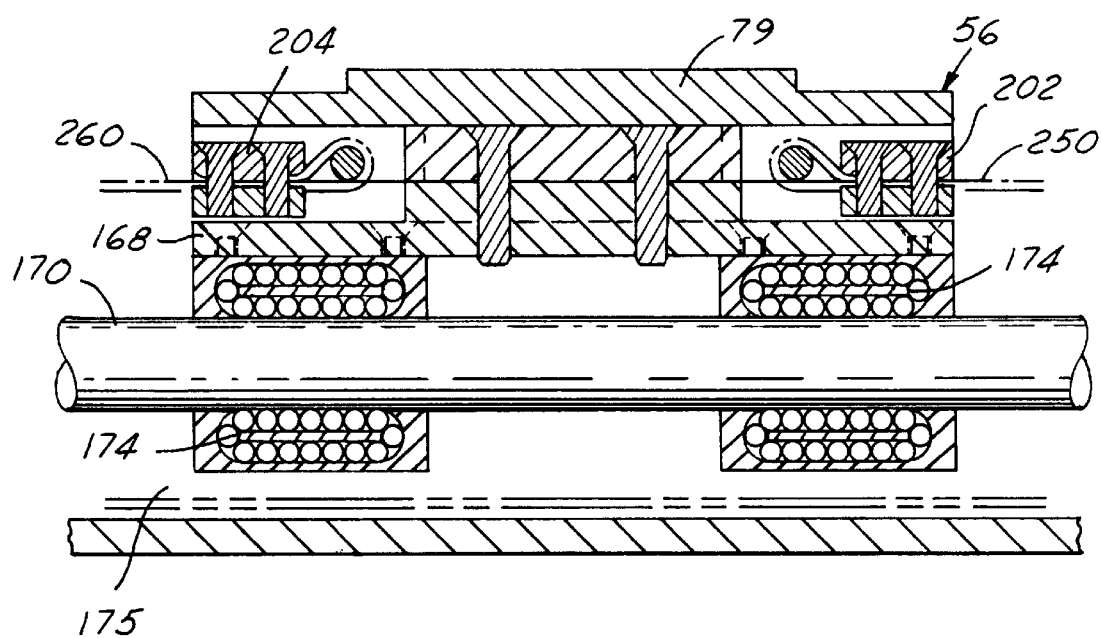
FIG. 15 is a fragmentary sectional view taken substantially along the line 15—15 in FIG. 11.

A first or horizontal carriage 56 (FIGS. 1, 2A, 3, 8 and 11) is mounted for horizontal motion on frame 34. Carriage 56 has a lower leg 160 (FIG. 11) that is slidably mounted on an underlying brace 162 of frame 34. Leg 160 has one or more depending bearings 164 that are received in a corresponding horizontal guide slot 166 on brace 162. An upper arm 168 extends from carriage 56 and is connected to slide bearings 174 (FIGS. 11 and 15) by a connecting plate 173. A longitudinally extending slot 172 in a longitudinal slide-bearing cavity 175 seals the top horizontal slide bearing assembly from dust and grit. Thus, horizontal carriage 56 is supported for horizontal motion along frame 34. A magnet 78 (FIGS. 2A and 8) is mounted on a magnetic plate 79 at the upper end of carriage 56. (Plate 79 preferably is magnetic to concentrate magnetic flux.) Magnet 78 is mounted immediately beneath stator 36 carried by frame 34. Thus, magnet 78 forms an armature mounted on carriage 56 electromagnetically coupled to the laminations 38 of stator 36. Armature magnet 78 and stator 36 thus together form a first (horizontal) motor 80 for driving horizontal motion of carriage 56 with respect to frame 34.

On the lateral side of carriage 56 horizontally spaced from stator 44, carriage 56 carries a pair of vertically extending horizontally spaced rods 82, 84 (FIGS. 2B, 3, 5, 7 and 9). A second or vertical carriage 86 comprises a base 88 from which four linear bearings 90 extend. Linear bearings 90 are mounted in vertically aligned horizontally spaced pairs that slidably embrace rods 82, 84. Thus, carriage 86 is vertically slidable on rods 82, 84 with respect to horizontal carriage 56 on which rods 82, 84 are mounted. Take-out tongs 30a, 30b, 30c, 30d (FIGS. 1, 2B, 3, 11 and 14) are carried by a foot 92 that is suspended by vertical legs 93, 94 beneath carriage 86. Each take-out tong comprises a pair of opposed tong elements 96, 98 pivotally mounted to a fixed pin 100. The tong elements are coupled by a pin 102 to a piston 104 within an associated cylinder 105 on foot 92. All of the cylinders 105 are connected in common by a suitable coupling 106 (FIG. 3) to a suitable air supply 108 (FIG. 10). Thus, tong elements 96, 98 are opened and closed around the necks of glassware containers, for example, under control of air supply 108. The tong elements are resiliently urged apart or open by a coil spring 109. A magnet support 110 (FIGS. 3, 5 and 9) is mounted to carriage base 88 by a pair of vertically spaced screws 112 that extend between rods 82, 84. A permanent magnet 114 is mounted to support 110 by a connecting plate 116. Magnet 114 is positioned in closely spaced opposition to the laminations of stator 44. Thus, permanent magnet 114 forms an armature which, in combination with stator 44, forms a second (vertical) motor 118 for moving carriage 86 in the vertical direction with respect to carriage 56 and frame 34. Thus, horizontal carriage 56 is movable on frame 34 under control of motor 80, and vertical carriage 86 is movable on horizontal carriage 34 under control of motor 118.

A first cogged belt 200 (FIGS. 1, 2A, 8 and 12–14) has opposed ends secured by clamps 202, 204 to horizontal carriage 56 at the upper end of the horizontal carriage. Intermediate its ends, belt 200 is trained around three idler sprockets 206 carried in stationary position on frame 34. Belt 200 also engages a sprocket 208 that is mounted in stationary position on the frame for co-rotation with an enlarged sprocket 210. A cogged belt 212 is trained around sprocket 210, and around a sprocket 214 that is rotatably coupled to a position sensor 216. Sensor 216 has an output connector 218 for feeding horizontal carriage position signals to control electronics as will be described. The pitch of sprockets 206, 208, 210 and 214 are coordinated with the pitch of cogged belt 200 so that a given amount of linear horizontal motion at carriage 56 results in a corresponding predetermined rotation at sprocket 218 and sensor 216. In one working embodiment of the invention, one inch of travel at carriage 56 results in 360° of rotation at sprocket 214 and sensor 216.

A second cogged belt 220 (FIGS. 1–2B, 5–7, 9, 11–14) is looped over an idler sprocket 222 mounted at the upper portion of carriage 56, and around a sprocket 224 on carriage 56 vertically spaced beneath sprocket 222. The opposed ends of belt 220 are clamped at 226, 228 (FIGS. 7 and 10) to vertical carriage 86. A cogged belt 230 is trained around an idler sprocket 222 mounted for free rotation on frame 34. Belt 230 also extends around sprocket 224, and around a sprocket 234 that is coupled for co-rotation to an enlarged sprocket 236 carried by the support frame. A cogged belt 238 extends around sprocket 236, and around a sprocket 240 that is rotatably coupled to a position sensor 242. Sensor 242 has an output connector 244 for connection to the control electronics. Tension is maintained in belt 230 by a pair of freely rotatable pulleys 246 mounted on horizontal carriage 56. Thus, as vertical carriage 86 moves upwardly and downwardly on horizontal carriage 56, such vertical motion is transmitted by clamps 226, 228 to belt 220, and thence by sprocket 224 to belt 230. Once again, the diameters of sprockets 222, 224, 232, 234, 236 and 240 are selected in coordination with the pitches of belts 220, 230 so that a given amount of linear motion results in a corresponding fixed amount of rotation at sprocket 240 and sensor 242. Again, in a working embodiment of the invention, the components are selected such that one inch of linear motion results in 360° of rotation at the sensor. It will be appreciated, of course, that sensor 242 is responsive to both horizontal motion of carriage 56 and vertical motion of carriage 86. However, by monitoring the outputs of both sensors 216, 218, the control electronics can determine the amount of horizontal motion directly from sensor 216, and the amount of vertical motion by subtracting the output of sensor 216 from the output of sensor 242. Sensors 216, 242 may be of any suitable type. Resolver-type position sensors are currently preferred, as illustrated in FIG. 10.

Figure 13:
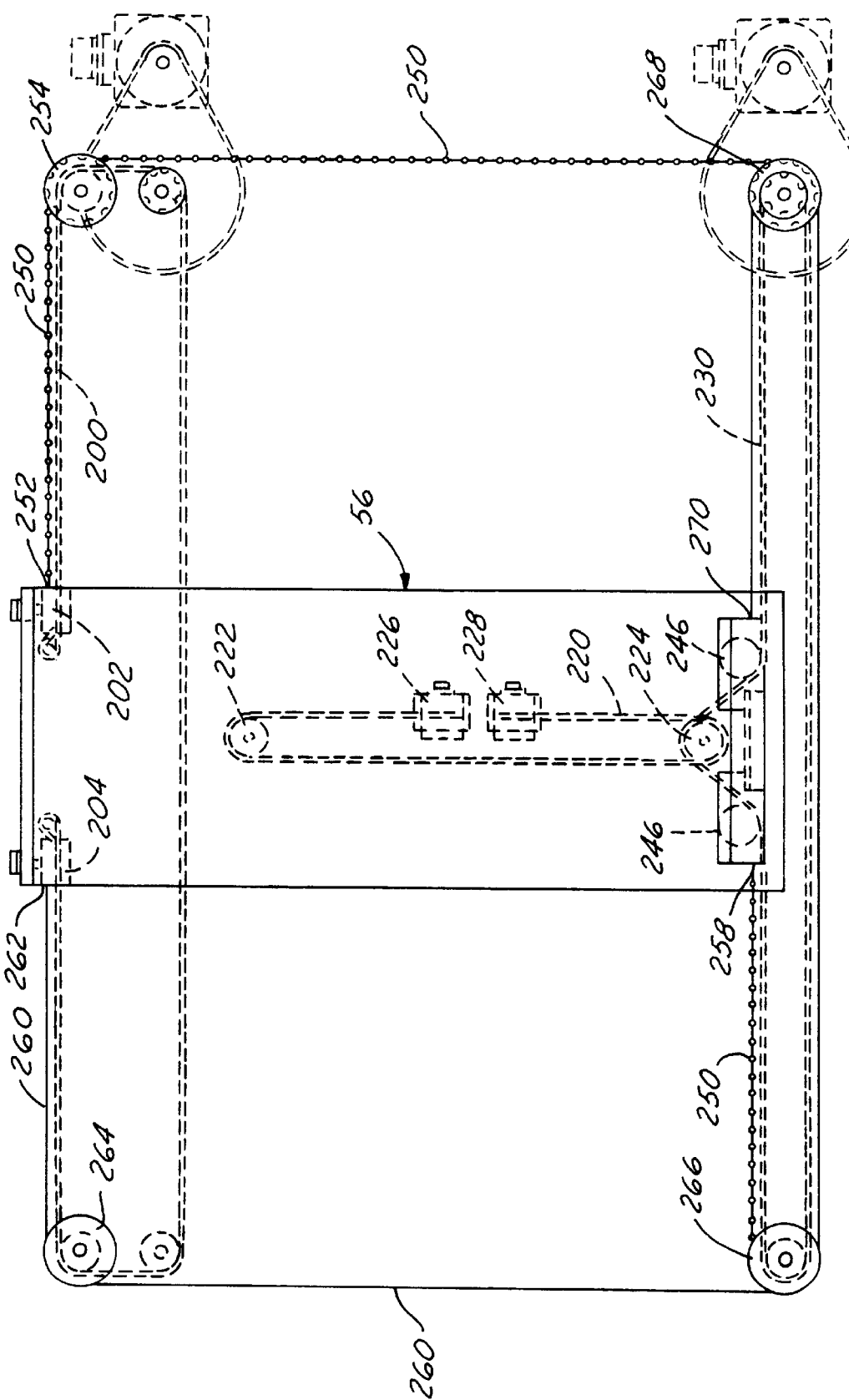
FIG. 13 is a schematic diagram that illustrates interconnection of the horizontal carriage to the stationary frame for vibration damping.
Figure 14:
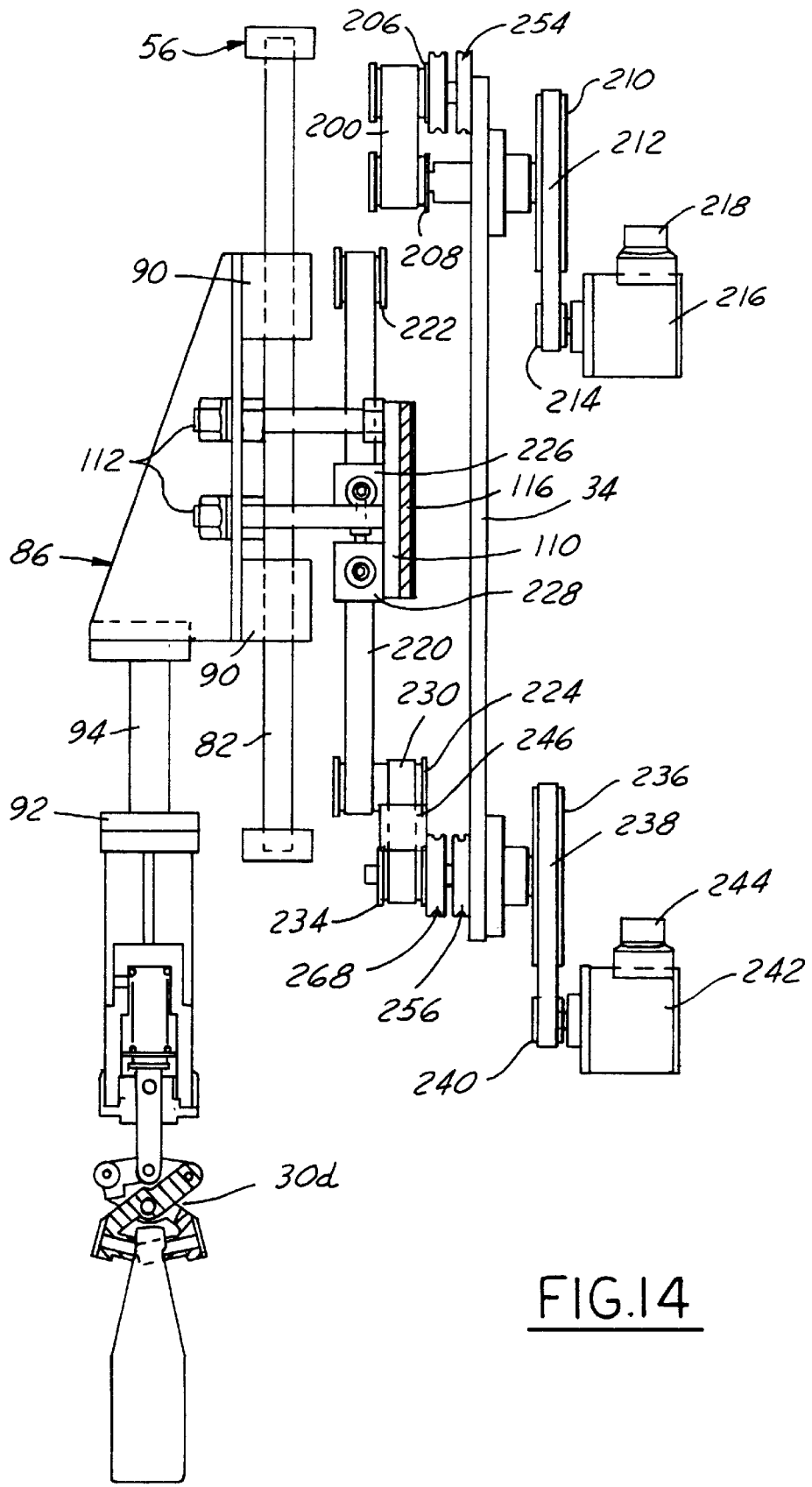
FIG. 14 is an elevational view similar to that of FIG. 3 but with elements deleted to illustrate the position belts and tension cables of the present invention.

A tension cable system is employed for reducing vibrations in the take-out tong assembly. Referring to FIGS. 13 and 14, a first cable 250 is affixed at 252 to one side of horizontal carriage 56 at the upper end of the horizontal carriage. Cable 250 is trained in tension around a pulley 254 (FIG. 14) mounted for free rotation about the axis of cog 206, and thence around a pulley 256 (FIG. 14) mounted for free rotation about the axis of cog 234, and thence horizontally along the bottom of frame 34 around another pulley freely rotatable about the axis of cog 232, and thence to the lower side edge of carriage 56 where it is affixed at 258. Likewise, a cable 260 is affixed at 262 to the upper side edge of horizontal carriage 56, and extends in tension around a pulley 264 freely rotatable on the axis of cog 206, around a pulley 266 freely rotatable on the axis of sprocket 232, around the pulley 268 (FIGS. 13 and 14) freely rotatable on the axis of sprocket 234, and is affixed at 270 to the lower side edge of horizontal carriage 56. Thus, cables 250, 260 cooperate with each other to prevent vibration of horizontal carriage 56 as the horizontal carriage is translated on frame 34.

A first handle 140 (FIG. 3) is rotatably mounted at the upper end of frame 34, and is coupled to sprocket 210 for manually positioning carriage 56 horizontally with respect to frame 34. A second handle 142 is rotatably mounted at the lower end of frame 34, and is coupled to sprocket 236 for manually positioning vertical carriage 86 with respect to horizontal carriage 56. FIG. 10 illustrates a motor controller 144 connected through a servo drive 146 to horizontal motor 80, and through a second servo drive 148 to vertical motor 118. Servo drives 146, 148 receive second inputs from resolvers/sensors 216, 242, respectively. Thus, each motor 80, 118 comprises a servo motor for accurately controlling horizontal position and vertical position respectively at the take-out tongs. Controller 144 is also connected to air control 108 for controlling grasping and releasing at the take-out tongs.

In operation, horizontal and vertical motion of the take-out tongs is controlled by motion controller 144 in the usual manner. Horizontal motor 80, comprising stator 36 and magnet armature 78 on carriage 56, controls horizontal motion of carriage 56, and thus horizontal motion of the take-out tong assembly carried by carriage 56 through vertical carriage 86. Vertical motor 118, comprising stator 44 and magnet armature 114, controls vertical motion of vertical carriage 86 with respect to horizontal carriage 56, and thus controls vertical motion of the take-out tong assembly suspended from vertical carriage 86. The elongated horizontal dimension of stator 44 accommodates motion of carriage 86 throughout the horizontal range of carriage 56, and the vertical dimension of stator 44 accommodates vertical motion of carriage 86 throughout its range. Thus, stator 44 is of enlarged flat rectangular dimension. Electrical connection is made to the drive motors using stationary wiring, as opposed to using a rolling wire way as in the prior art. This helps reduce wire abrasion and allows greater acceleration and deceleration rates.

What is claimed is:

1. An individual section glassware forming machine that includes at least one blow mold for forming articles of glassware, a sweepout station for transferring glassware to a machine conveyor, and a take-out mechanism for transferring glassware from said at least one blow mold to the sweepout station, said take-out mechanism comprising:

first and second electromagnetic stators, each with associated electrical windings, means for mounting both of said first and second stators in stationary position relative to each other above said at least one blow mold and sweepout station, and including means for making stationary electrical connection to said windings of both said stators, first and second electromagnetic armatures, means mounting a first of said armatures for linear motion along a first axis adjacent to said first stator such that electromagnetic coupling between said first stator and said first armature propels said first armature along said first axis, means mounting said second armature to said first armature for linear motion along a second axis perpendicular to said first axis adjacent to said second stator such that electromagnetic coupling between said second stator and said second armature propels said second armature along said second axis with respect to said first armature, and take-out means carried by said second armature for engaging and transferring glassware from said at least one blow mold to said sweepout station.

2. The machine set forth in claim 1 wherein said means for mounting said second stator is adapted to position said second stator in a vertical plane, with said second stator having a first dimension corresponding to motion of said first armature along said first axis and a second dimension perpendicular to said first dimension corresponding to motion of said second armature along said second axis.

3. The machine set forth in claim 2 wherein said means mounting said first armature comprises a first carriage and means for mounting said first carriage to said stator-mounting means for motion along said first axis, and wherein said means mounting said second armature comprises a second carriage and means for mounting said second carriage to said first carriage for motion along said second axis.

4. The machine set forth in claim 3 wherein said means for mounting said first armature includes means for stabilizing motion of said first carriage with respect to said stator-mounting means.

5. The machine set forth in claim 4 wherein said motion-stabilizing means comprises pulleys carried by said stator-mounting means for free rotation, and cables trained in tension around said pulleys and coupled to said first carriage.

6. The machine set forth in claim 3 wherein said means for mounting said second carriage to said first carriage comprises guide means carried by said first carriage and means slidably mounting said second carriage on said guide means.

7. The machine set forth in claim 6 wherein said guide means comprises a pair of spaced parallel rods, and wherein said slidably mounting means comprises slide bearings carried by said second carriage.

8. The machine set forth in clam 7 wherein said second armature comprises a permanent magnet carried by said second carriage for motion in a plane adjacent and parallel to said second stator.

9. The machine set forth in claim 8 wherein said first armature comprises a permanent magnet carried by said first carriage for motion along said first axis adjacent and parallel to said first stator.

10. The machine set forth in claim 3 wherein said first stator comprises a first plurality of ferromagnetic laminations perpendicular to said first axis and a plurality of first stator coils coupled to said first laminations, and wherein said second stator comprises a second plurality of ferromagnetic laminations perpendicular to said second axis and a plurality of second stator coils coupled to said second laminations.

11. The machine set forth in claim 10 further comprising control means for connection to said first and second stator coils for controlling motion of said armatures.

12. The machine set forth in claim 11 further comprising first and second sensors carried in stationary position by said stator-mounting means, and means coupling said first and second sensors to said first and second carriages respectively, said first and second sensors providing electrical signals to said control means indicative of motion at said first and second carriages respectively.

13. The machine set forth in claim 12 wherein said coupling means comprises first belt means coupling said first carriage to said first sensor such that said signal at said first sensor is indicative of motion of said first carriage along said first axis and second belt means coupling said second sensor to said second carriage such that said signal at said second means is indicative of motion of said second carriage along both of said axes, and wherein said machine further comprises means for determining motion of said second carriage along said second axis as a function of a difference between said first and second signals.

14. The machine set forth in claim 13 wherein said means coupling said first and second sensors to said first and second carriages comprise sprockets carried by said first carriage and said stator-mounting means, and belts trained around said sprockets and coupled to said carriages.

15. The machine set forth in claim 14 further comprising electrical connectors carried in stationary position said stator-mounting means for removably electrically connecting said armatures and said sensors to said controls means.

16. The machine set forth in claim 3 wherein said take-out means comprises take-out tongs suspended from said second carriage.

17. The machine set forth in claim 16 wherein said take-out tongs are air-operated.

18. An individual section glassware forming machine that includes at least one blow mold for forming articles of glassware, a sweepout station for transferring glassware to a machine conveyor, and a take-out mechanism for transferring glassware from the at least one blow mold to the sweepout station, said take-out mechanism comprising:

first and second electromagnetic motors, each including a stator with associated electrical windings and an armature, means for mounting each said stator in stationary position above said blow mold and sweepout station, means on said mounting means for making electrical connection to said stator windings, such that said electrical connection means remains stationary upon motion of said armatures, and take-out means carried by said armatures for engaging and transferring glassware from said at least one blow mold to said sweepout station.

* * * * *